No. 675,939. Patented June 11, 1901.
T. EDGINGTON.
BRAKE.
(Application filed Feb. 7, 1901.)
(No Model.)
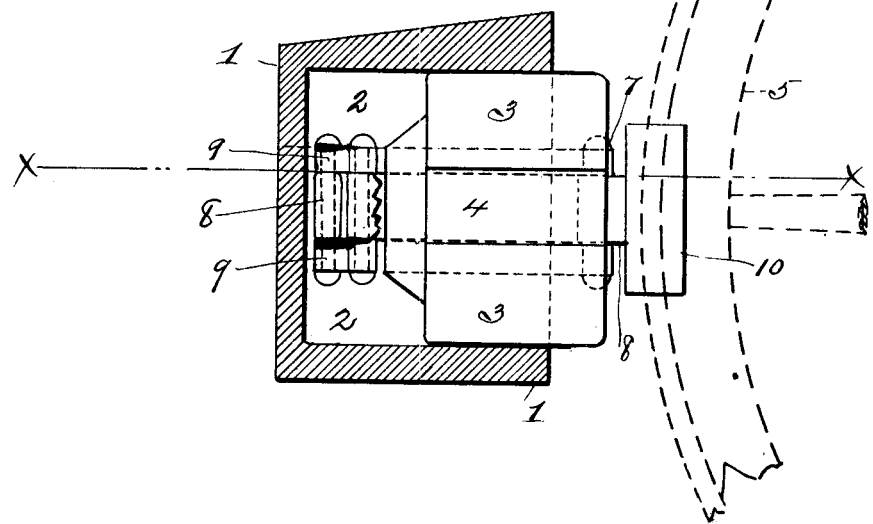
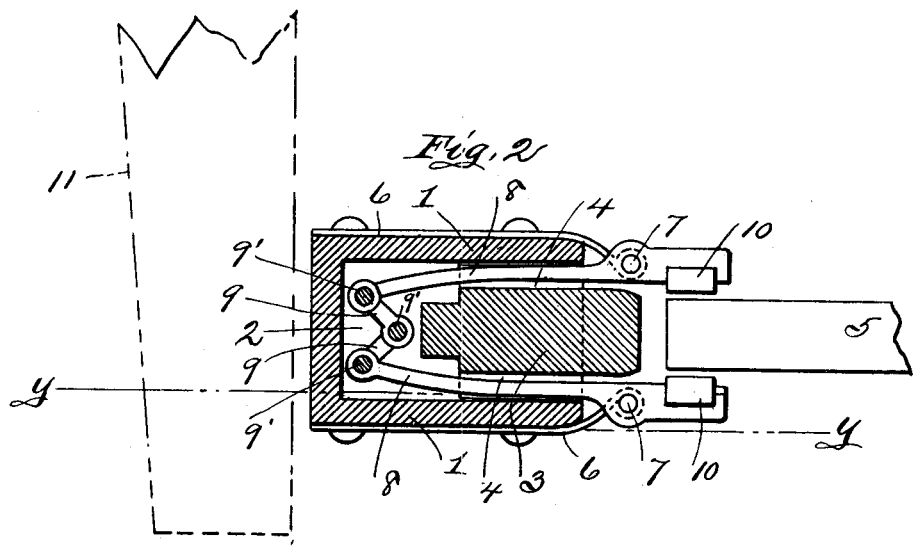

UNITED STATES PATENT OFFICE.

THOMAS EDGINGTON, OF GUYANDOTTE, WEST VIRGINIA.

BRAKE.

SPECIFICATION forming part of Letters Patent No. 675,939, dated June 11, 1901.

Application filed February 7, 1901. Serial No. 46,356. (No model.)

*To all whom it may concern:*

Be it known that I, THOMAS EDGINGTON, a citizen of the United States of America, residing at Guyandotte, in the county of Cabell and State of West Virginia, have invented certain new and useful Improvements in Vehicle or other Brakes; and I do hereby declare the following to be a full, clear, and exact description thereof, reference being had to the accompanying drawings, which form a part of this specification.

This invention relates to an improved vehicle or other brake; and it consists in certain details of construction and combination of parts, as will be fully described hereinafter.

In the accompanying drawings, Figure 1 is a side sectional elevation of my improved vehicle-brake, which is constructed and arranged in accordance with my invention, the said section being taken on the line Y Y of Fig. 2. Fig. 2 is a sectional plan view taken on the line X X of Fig. 1.

To put my invention into practice, and thereby provide a brake for wagons, carriages, cars, &c., I form from a suitable material a block 1, of a suitable size, and form therein a deep mortise 2, the said block being rectangular in form and adapted to be attached to the brake-beam 11 of any vehicle. Arranged within this mortise 2 is a sliding block 3, capable of a slight inward and outward movement, and the said block formed at either side with recesses 4, through which two levers 8 operate. These levers 8 are pivoted to spring-bearings 6, attached to the block 1 at each side, and the levers each provided with frictional rubbers or contact-pieces 10, integral with their outer extremities. The inner ends of the levers 8 are connected by links 9 and hinge-pins 9' to form a toggle-joint, as will be seen by reference to Fig. 2 of the drawings, in such a manner that when the wheel 5 of the vehicle (to which the brake is attached) is brought in contact with the block 3 the same is moved back into the mortise 2 and in contact with the toggle-joint 9, thereby spreading the levers 8 and moving the same about their pivots 7 to bring the rubber blocks 10 in close contact with the sides of the vehicle-wheel 5. This movement of the device against or in contact with the wheel 5 may be accomplished by any of the well-known and common devices now in use, and it is obvious that the greater the pressure between the said wheel and the sliding block 3 the greater the pressure will be between the rubber blocks 10 and the wheel 5. When the brake-beam is released and moves back, the spring-bearings 6 will remove the rubber blocks 10 from contact with the wheel and at the same time bring the toggle connection 9 to the position shown at Fig. 2 of the drawings.

Various slight modifications and changes may be made in the details of construction without departing from the spirit of the invention.

Having thus described my invention, what I claim, and desire to secure by Letters Patent, is—

The herein-described brake, consisting of the block 1, having a deep mortise 2, the sliding block 3, arranged therein, and adapted to have a limited movement, the levers 8, projecting into the said mortise, and at either side of the said sliding block, the toggle connection 9, attaching the inner ends of the said levers together, the spring-bearings 7 for supporting the levers, and the rubbers or shoes at the outer ends of the levers, adapted to take a frictional hold upon the side of the wheel, all arranged and combined for service, substantially as and for the purpose described.

In testimony whereof I have hereunto affixed my signature in the presence of two subscribing witnesses.

THOMAS EDGINGTON.

Witnesses:
 J. O. MAYBERRY,
 B. E. CHURCH.